United States Patent [19]

Ware

[11] 4,063,660
[45] Dec. 20, 1977

[54] ELECTRICAL OUTLET BOX
[75] Inventor: Gordon K. Ware, St. Charles, Ill.
[73] Assignee: Ware Fuse Corporation, Chicago, Ill.
[21] Appl. No.: 785,011
[22] Filed: Apr. 6, 1977
[51] Int. Cl.² .............................................. H02G 3/08
[52] U.S. Cl. ....................................... 220/3.6; 174/58; 248/27.3
[58] Field of Search ............................. 220/3.2–3.94; 174/53, 58; 248/27.1, 27.3

[56] References Cited
U.S. PATENT DOCUMENTS

| | | | |
|---|---|---|---|
| 1,400,155 | 12/1921 | Greenburg | 248/27.3 X |
| 2,424,757 | 7/1947 | Klumpp, Jr. | 248/27.3 X |
| 2,769,562 | 11/1956 | Rudolph | 220/3.6 X |
| 3,007,599 | 11/1961 | Greasley | 220/3.6 X |
| 3,197,548 | 7/1965 | Weitzman et al. | 220/3.3 X |
| 3,412,225 | 11/1968 | Rogers et al. | 200/303 X |
| 3,695,037 | 4/1972 | MacDonald | 220/3.6 X |
| 3,710,972 | 1/1973 | Barry | 220/3.6 |
| 3,749,873 | 7/1973 | Harper et al. | 200/293 |
| 3,848,764 | 11/1974 | Salg | 220/3.6 |
| 3,891,113 | 6/1975 | Salg | 220/3.6 |

FOREIGN PATENT DOCUMENTS

| | | | |
|---|---|---|---|
| 1,396,991 | 11/1965 | France | 174/58 |
| 2,500,295 | 7/1975 | Germany | 174/58 |

Primary Examiner—Stephen Marcus
Attorney, Agent, or Firm—Olson, Trexler, Wolters, Bushnell & Fosse, Ltd.

[57] ABSTRACT

A molded, plastic, hollow electrical connection box is disclosed. To support itself in a wall panel opening, the box includes stop ears formed at each end wall corner which extend perpendicularly to the end wall. Cooperating, mediately located cam segments of trapezoidal shape originally extend diagonally outwardly in planar configuration from the box end walls. After passing the panel during box insertion installation, the cam segments are permanently, rotatably deformed into positions extending generally parallel to the box end walls. In these positions, they permanently and compressively engage the supporting wall panel.

5 Claims, 5 Drawing Figures

U.S. Patent  Dec. 20, 1977  4,063,660
FIG. 1
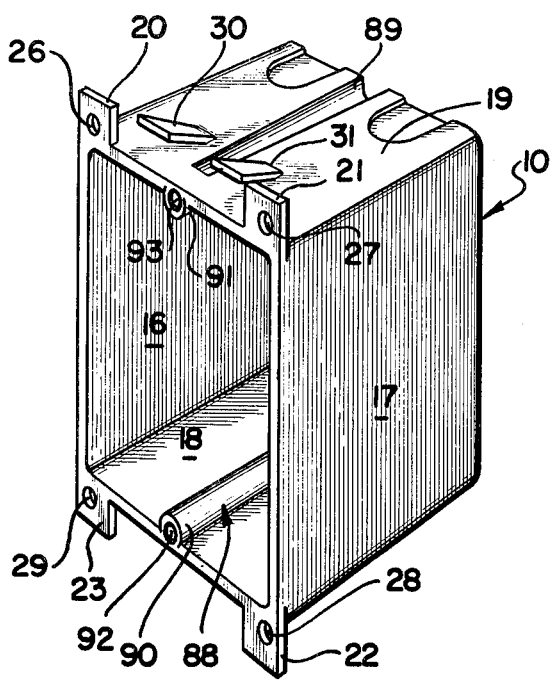
FIG. 2
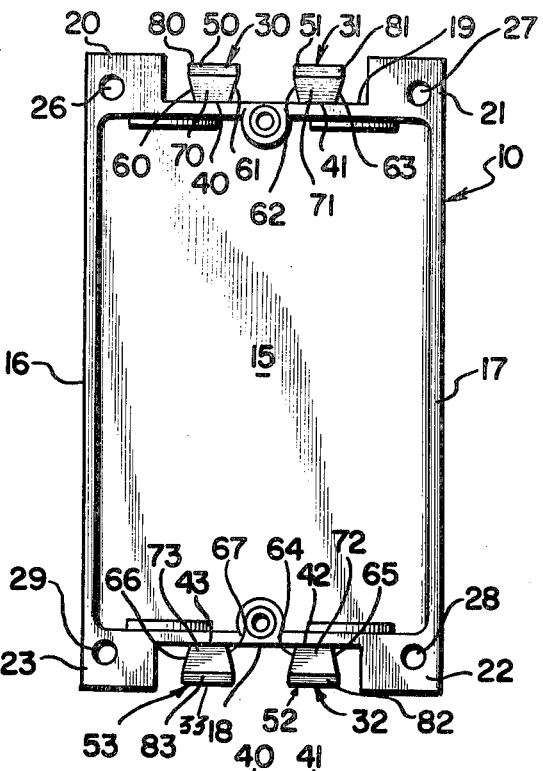
FIG. 4
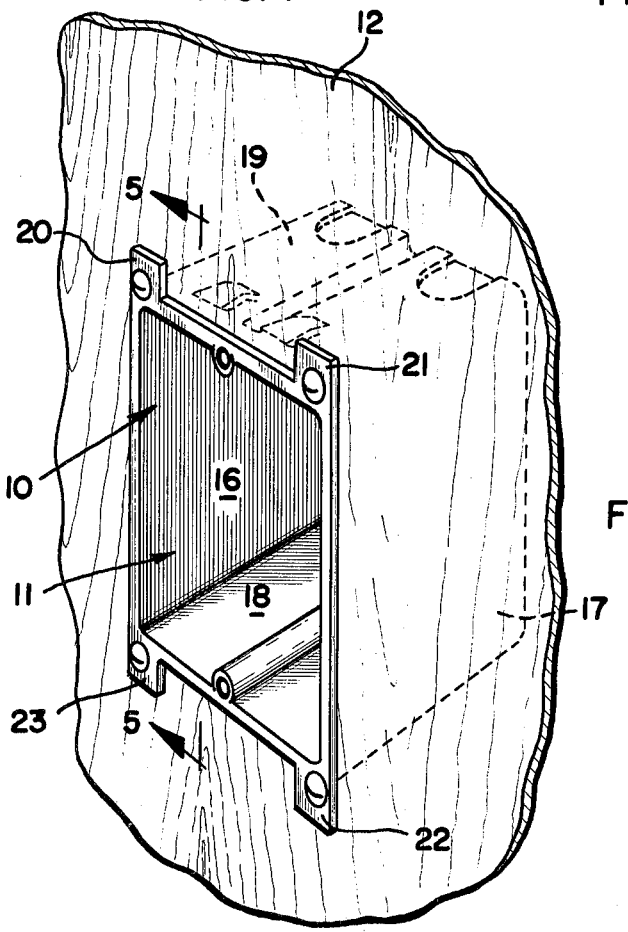
FIG. 3
FIG. 5
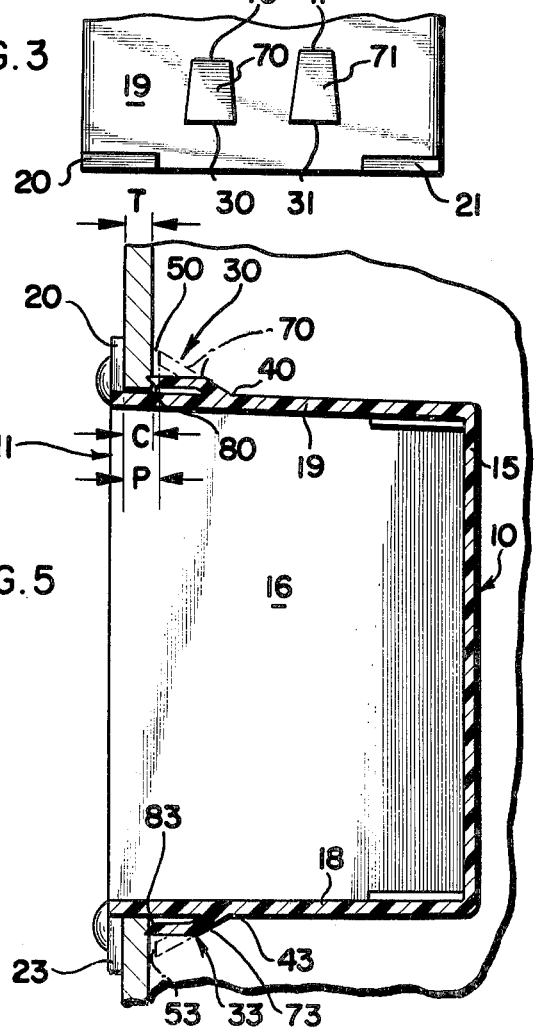

4,063,660

ELECTRICAL OUTLET BOX

BACKGROUND OF THE INVENTION

This invention relates generally to electrical connector boxes, and more particularly concerns an improved electrical connector box which can be easily mounted in a firm, secure condition in a wall panel opening or like location.

Electrical connector boxes are commonly used for accommodating the mechanical connection of electrical wires to light switches, wall socket structure and the like. They may also be used for connecting separate wires together to form a desired electrical system. These boxes are so ubiquitous that they are the subject of various regulations and requirements in building codes and like documents.

In addition to meeting legally required performance specifications, the boxes, to be commercially desirable, must be inexpensively offered and must permit easy, quick, inexpensive installation. They must provide long, trouble-free service life. Preferably, neither the boxes nor any box support structure will require maintenance during the useful life of the box.

To meet these demands, a large variety of electrical connector boxes have been commercially offered. Prior art boxes include those purportedly shown in U.S. Pat. Nos. 3,848,764 and 3,891,113.

It is the general object of the present invention to provide an electrical connector box which can be quickly, easily and permanently secured to a wall panel in a pre-formed panel opening, with minimal flexing forces being applied to both the box and the wall during installation. This force minimization acts to lessen the chances of damage occuring to either the box or the wall panel during box installation.

It is a more specific object to provide such a box having box-locking or box-securing structure which permanently shapes itself during insertion of the box into the wall panel, so as to better withstand extractive and shifting forces after the box is installed.

Another object is to provide such an electrical connector box which, after installation, will accept relatively great extractive forces without damage to either the box or supporting structure.

A further object is to provide the foregoing advantages in an electrical connector box of standard general size, shape and capacity.

A still further object is to provide a box of this type in a format which can be manufactured at relatively low cost, and consequently offered at a commercially attractive price.

Further objects and advantages of the invention will become apparent upon reading the following detailed description and upon reference to the drawings. Throughout the drawings, like reference numerals refer to the like parts.

BRIEF DESCRIPTION OF THE DRAWINGS

FIG. 1 is a perspective view showing a novel electrical connector box embodying the present invention in its general aspect;

FIG. 2 is a front elevational view of the electrical connector box shown in FIG. 1;

FIG. 3 is a fragmentary top plan view showing in further detail portions of the box end walls and accompanying cam segments;

FIG. 4 is a perspective view similar to FIG. 1 but showing the box as it appears when installed in a wall panel; and FIG. 5 is a sectional view taken substantially in the plane of line 5—5 in FIG. 4.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more particularly to the drawings, there is shown an embodiment of the present invention which here takes the form of a molded plastic hollow electrical connection box 10 which is adapted to support itself in an opening 11 formed in a wall panel 12. In general, this box comprises a back wall 15; from this back wall 15 forwardly extend two opposed side walls 16 and 17 and two opposed end walls 18 and 19. Together, the end wall 15 and the forwardly extending walls 16–19 define the open hollow box 10. This box and the constituent parts can be formed of an acrylonitrile butadiene styrene copolymer having suitable electrical and physical properties. Important among the desired physical properties is that the material be of limited flex memory, and provide less than 100% recovery to flexing parts.

The box 10 is adapted to be securely mounted to a support such as a wall panel 12. To this end, a plurality of stop ears 20–23 (defining screw-receiving apertures 26–29) and a plurality of associated, mediately located cam segments 30–33 are provided. Pursuant to the invention, foundation or support for the box in and against the wall can be broadly, extensively based by forming the stop ears 20–23 at each end wall corner as illustrated, and extending the ears 20–23 perpendicularly to the end walls 18 and 19 in a direction generally parallel to the planes of the side walls 16 and 17. It will be noted that these ears are thus located at each end wall - side wall corner.

To further maximize the length and breadth of the box support on the wall 12 the cams 30–33 are paired, and a pair of flexible cam segments 30, 31 and 32, 33 extend diagonally outwardly from the respective end walls 18 and 19. As illustrated these cam segments 30–33 are located between or mediately of those ears 20–23 extending from the same end walls 18 and 19.

In accordance with the invention, the wall 12 and box 10 impose but minimal forces on one another during box installation, yet the installation process is a simple insertive act. To obtain these results, the cam segments 30–33 are flexed as the box 10 is urged into the wall opening 11. After the box passes through the wall opening 11 into the fully installed position illustrated in FIGS. 4 and 5, the cam segments 30–33 snap or turn outwardly into the positions illustrated in FIG. 5 to retain the box 10 in the wall 12. It is important to note, however, that these cam elements 30–33 do not return to their original, unbent, planar positions. Rather, they move into the illustrated past-panel cam positions relatively parallel to the box end walls 18 and 19 to provide a firm support for the box 10 against the wall 12.

To encourage the described cam segment flexing and partial return action, each flexible cam segment 30–33 is defined by a small segment-end wall interconnecting base 40–43 and a large free end 50–53. Each segment is here further defined by straight segment sides 60-67 which extend from the respective small bases 40-43 to the large free support ends 50-53. As illustrated particularly in FIG. 3, the segment ends, bases and sides thus define or provide a trapezoidal appearance to the diagonally outwardly extending cam segment 30-33.

To provide relatively easy cam segment flexure, and in order that the box 10 can be slipped into the wall aperture or hole 11 with relative ease and minimal force, it is important to note that these cam segments 30-33 are free of any support from the associated end walls save at the associated cam segment bases 40-43. To provide rigid bases or foundations for these cam segments, the underlying end walls 18 and 19 are solid at their tops as illustrated. As a result, box flexing action is required only in the cam segments, and not necessarily in the box body defined by the walls 17-19. The walls 17-19 are thus discouraged from cracking or other flexure-caused damage.

Since the segment bases 40-43 are relatively small in extent, and since the cam segment free ends 50-53 are relatively large, the small bases and the large free ends act together to cause cam segment flexure predominantly in respective cam segment flexure regions 70-73 adjacent the associated bases 40-43. Thus, cam segment flexure as the box is inserted into the wall 12 is not of a random nature. Rather, the cam segment free ends 50-53 rotate, in a controlled manner, into their panel-passing position adjacent the end walls. As this cam rotation occurs, a partial permanent set in the cam segments 30-33 is caused in the segment flexure region 70-73. Consequently, after the cam segments 30-33 are urged completely past the panel 12, they spring back only partially toward their original, preassembly positions, as can be envisioned from FIG. 5.

In further accordance with the invention, these past-panel cam positions permanently locate the cam free ends 50-53, the cam flexure regions 70-73, and those portions of the cams between the free ends and the cam flexure regions in positions which are relatively parallel to the associated box end walls 18 and 19 as illustrated in FIG. 5. The box structure, when so arranged, can accommodate without damage forces tending to pull the box 10 out of the wall panel 12.

In carrying out the invention, the cam flexure and partial return action tends to solidly crimp the box 10 into the desired attached position in the panel 12. To this end, the cams 30-33 are originally provided so as to extend only to a preliminary distance P from the associated ears 20-23. However, in their past-panel set position, the cam segment free ends 50-53 are rotated so as to be located closer to the ears 20-23 at a distance C than the original cam segment free end preliminary position distance P. This closure action compressively squeezes the panel 12 between the ears 20-23 and the cam segments 30-33 and permanently, compressively loads the cam segments 30-33 when distance C is less than the normal, predetermined thickness T of the panel 12. The permanent compressive load discourages cam disengagement from the panel 12 and the consequent likelihood of box shifting action.

To further encourage this permanent cam engagement in accordance with yet another aspect of the invention, the cam segments 30-33 are provided, at the free ends 50-53, with flat terminal surfaces 80-83 which are oriented, when the cam segments 30-33 are located in their preliminary positions, relatively parallel to the ears 20-23. When, however, the cam segments 30-33 are rotated into their past-panel permanently set positions, these free end terminal surfaces 80-83 are carried in a beveled orientation, thus providing a chisel-like profile or configuration to the cam segment free ends 50-53. This chisel-like configuration permits the cam segments to firmly and permanently engage the wall panel 12 adjacent the panel opening 11.

In further accordance with the invention, the forces imposed on the wall 12 by the box 10 during box insertion can be not only minimized, but also can be staggered. To accomplish this, structural arrangements such as those shown in FIG. 3 are provided. Here, one cam segment 30 of each pair 30, 31 on each end wall 19 has its base 40 located closer to the box top and its cooperating ear 20 than the base 41 of the other cam segment 31. Staggered, reduced-force flexing action is provided in this way to the cam segments 30 and 31, box end wall 19 and wall panel 12 as the box 10 is urged into position on the panel 12.

It is a feature of the invention that box use is not prohibited even when the wall aperture 11 has been improperly sized or cut. For this reason, the screw-receiving apertures 26-29 permit the box and associated ears 20-23 to be flexed and fastened to misshapen wall panel aperture 11, if necessary.

After the electrical connector box has been mounted as described, electrical devices such as switches, plug receptacles or other devices can be mounted on and in the box 10. In the illustrated embodiment, the box 10 is provided with outwardly opening channels 88 and 89 centrally located in and on associated end walls 18 and 19 adjacent the box opening. Embossments 90 and 91 define screw-accepting apertures 92 and 93 which communicate with the channels 88 and 89 so as to support a screw fastener (not shown) of extended length for securing apparatus within the box 10.

The invention is claimed as follows:

1. A molded plastic hollow electrical connection box structure adapted to support itself in a small panel opening, the box comprising a back wall, a plurality of opposed sidewalls and a plurality of opposed endwalls, solid at their top, the sidewalls and endwalls extending forwardly from the back wall to collectively define, with said back wall, an open hollow box, and box-panel mounting means formed integrally with the endwalls, the mounting means including a stop ear formed at each sidewall corner and extending perpendicularly to the endwall and parallel to the adjacent sidewall and to an opposite stop ear formed at the opposite endwall corner, the mounting means further including a pair of trapezoidal, flexible cam segments extending diagonally outwardly from each endwall, each flexible cam segment being spaced mediately of the adjacent ears, each flexible cam segment end being defined by a small segment-endwall interconnecting base and a large free end and outwardly and upwardly disposed sides extending from the small base to the large free support end, the end, base and sides thereby defining the trapezoidal appearance of each cam segment, each cam segment side being free of any support from the associated endwall save at the cam segment base, the free end being spaced apart from the underlying wall to permit the cam segment to flex as the box is urged into the wall panel opening, each cam segment being originally arranged in a relatively unbent, planar, pre-assembly configuration, the small base and large free end acting together to cause cam segment flexure predominately in a cam segment flexure region adjacent the base, whereby to rotate the cam segment free end into a panel-passing position adjacent the endwall and causing a partial permanent set in the cam segment flexure region, the cam, when urged completely past the panel, springing back only part way toward its original pre-assembly position, the pastpanel cam position permanently locating that portion of the cam between the cam free end and the flexure region in a position relatively parallel to the box end wall so as to accommodate without damage forces tending to pull the box out of the wall panel, and rotating the cam segment free end into a past-panel position closer to the ears than the original cam segment free end position so as to compressively squeeze the panel between the ear and the cam segments and permanently compressively load the cam segments, one cam segment of each pair on each endwall having its base located closer to the box top and cooperating ears than the base of the other cam segment so as to provide staggered, reduced-force flexing action to the cam segments, box endwalls and wall panel as the box is urged into position on the panel.

2. A molded plastic electrical connection box according to claim 1 wherein each said ear defines a screwreceiving aperture to permit the box and ears to be flexed and fastened to a misshapen wall panel aperture.

3. A molded plastic electrical connection box according to claim 1 wherein said cam segment free ends each terminate in planar, panel-engaging surfaces oriented substantially parallel to said ears when the cam segments are located in their planar pre-assembly positions, the cam segment free end panel-engaging surfaces being located, when the cam segments have been rotated and permanently set in their past-panel positions, in chisellike configurations to crushingly and permanently engage the wall panel adjacent the panel opening.

4. A molded plastic electrical connection box according to claim 1 wherein said box is provided with outwardly opening channels separately located in each said box end wall, and wherein said electrical connection box is further provided with embossments defining screw-accepting apertures located centrally and adjacent the end walls inside the box opening, each embossment aperture communicating with a channel to accept a screw fastener of extended length for securing apparatus within the box.

5. A molded plastic hollow electrical connection box structure adapted to support itself in a small panel opening, the box comprising a back wall, a plurality of opposed sidewalls and a plurality of opposed endwalls, solid at their top, the sidewalls and endwalls extending forwardly from the back wall to collectively define, with said back wall, an open hollow box, and box-panel mounting means formed integrally with the endwalls, the mounting means including a stop ear formed at each endwall corner and extending perpendicularly to the endwall and parallel to the adjacent sidewall and to an opposite stop ear formed at the opposite endwall corner, the mounting means further including a pair of trapezoidal, flexible cam segments extending diagonally outwardly from each endwall and formed of material having a limited flex memory having less than 100 percent recovery, each flexible cam segment being spaced mediately of the adjacent ears, each flexible cam segment end being defined by a small segment-endwall interconnecting base and a large free end and outwardly and upwardly disposed sides extending from the small base to the large free support end, the end, base and sides thereby defining the trapezoidal appearance of each cam segment, each cam segment side being free of any support from the associated endwall save at the cam segment base, the free end being spaced apart from the underlying wall to permit the cam segment to flex as the box is urged into the wall panel opening, each cam segment being originally arranged in a relatively unbent, planar, pre-assembly configuration, the small base and large free end acting together to cause cam segment flexure predominately in a cam segment flexure region adjacent the base, whereby to rotate the cam segment free end into a panel-passing position adjacent the endwall and causing a partial permanent set in the limited-flex-memory-material cam segment flexure region, the cam, when urged completely past the panel, springing back only part way toward its original pre-assembly position, the past-panel cam position permanently locating that portion of the cam between the cam free end and the flexure region in a position relatively parallel to the box end wall so as to accommodate without damage forces tending to pull the box out of the wall panel, and rotating the cam segment free end into a past-panel position closer to the ears than the original cam segment free end position so as to compressively squeeze the panel between the ear and the cam segments and permanently compressively load the cam segment.

* * * * *